United States Patent [19]

Gannon et al.

[11] Patent Number: 6,145,082
[45] Date of Patent: Nov. 7, 2000

[54] METHOD FOR A VEHICULAR GATEWAY TO TRANSPORT INFORMATION, INCLUDING A METHOD FOR PROGRAMMING THE GATEWAY

[75] Inventors: Mark Alan Gannon, Sleepy Hollow; Michael Barnea; Allan M. Kirson, both of Highland Park, all of Ill.

[73] Assignee: Motorola, Inc., Schaumburg, Ill.

[21] Appl. No.: 09/045,336

[22] Filed: Mar. 20, 1998

[51] Int. Cl.[7] .................................................... G06F 13/00
[52] U.S. Cl. ............................................................ 713/201
[58] Field of Search ................................. 713/200, 201; 710/200

[56] References Cited

U.S. PATENT DOCUMENTS

| 5,606,668 | 2/1997 | Shwed ......................................... 380/42 |
| 5,623,601 | 4/1997 | Vu ............................................. 713/202 |
| 5,642,513 | 6/1997 | Schnellinger et al. ................... 395/705 |
| 5,720,035 | 2/1998 | Allegre et al. ...................... 395/200.55 |
| 5,828,846 | 10/1998 | Kirby et al. ........................ 395/200.68 |
| 5,892,903 | 4/1999 | Klaus ....................................... 713/201 |

*Primary Examiner*—Paul R. Myers
*Attorney, Agent, or Firm*—Wayne J. Egan; Nicholas C. Hopman; John J. King

[57] ABSTRACT

A vehicle (100) includes vehicle systems (11–13) coupled to a vehicle bus (10) and user devices (40–60) coupled to a user bus (30), the user bus coupled to the vehicle bus by a gateway (20). The user bus transports user information and the vehicle bus transports vehicle information. Based on one or more gateway rules, the gateway transports vehicle information to the user bus for the benefit of target user devices. Also based on these gateway rules, the gateway transports user information to the vehicle bus for the benefit of target vehicle systems. The gateway rules are programmed by both user devices and vehicle systems as follows: First, a proposed rule is provided (303) to the gateway. Second, the gateway determines (305) when to accept the proposed rule based on a variety of factors. Third, when the proposed rule is accepted, the proposed rule becomes (307) a gateway rule.

58 Claims, 1 Drawing Sheet

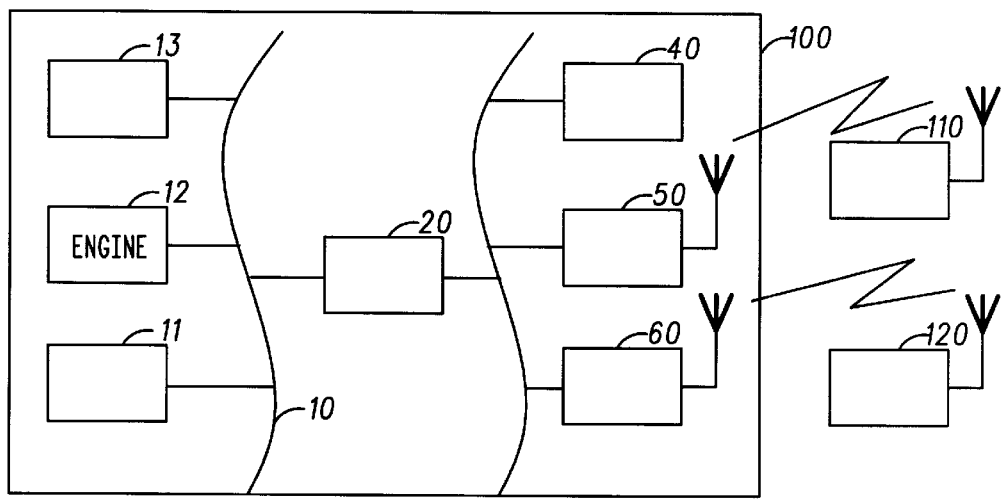
FIG.1
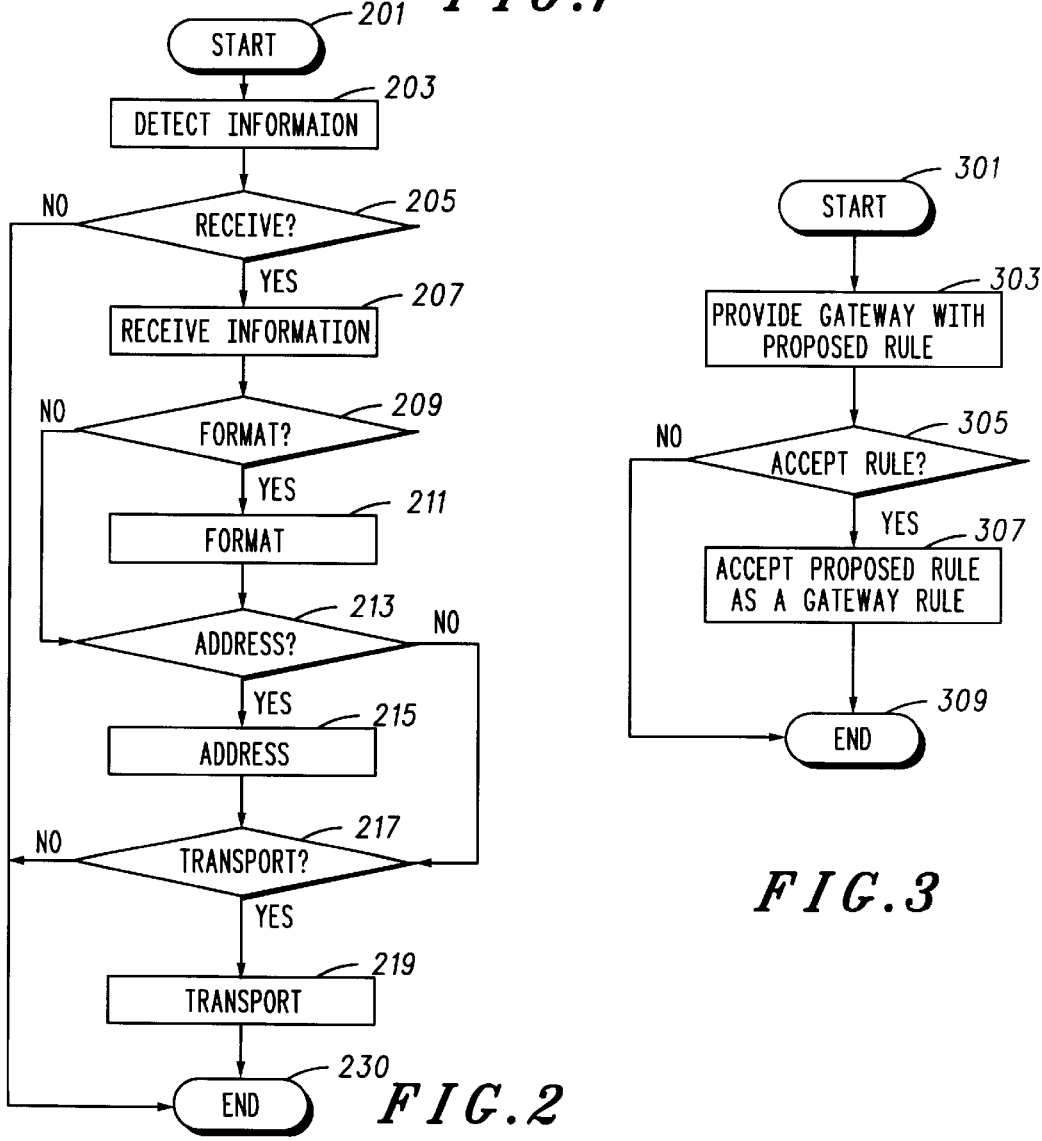
FIG.2
FIG.3

METHOD FOR A VEHICULAR GATEWAY TO TRANSPORT INFORMATION, INCLUDING A METHOD FOR PROGRAMMING THE GATEWAY

CROSS-REFERENCE TO RELATED APPLICATION

This is a continuation-in-part of commonly-assigned prior application filed Mar. 18, 1998, by Mark A. Gannon entitled "Method for registering vehicular bus functionality", the disclosure of which prior application is hereby incorporated by reference verbatim, with the same effect as though the disclosure were fully and completely set forth herein.

FIELD OF THE INVENTION

This application relates to telematics including, but not limited to, a method for a vehicular gateway to transport information, including a method for programming the gateway.

BACKGROUND OF THE INVENTION

It is known for a vehicle, such as a car, to have both a vehicle bus and a user bus. As known, typically the vehicle bus supports the various vehicle systems, such as an engine, instrument display, door locks, flashing lights, etc. Also, typically the user bus supports various user devices, such as a cell phone, a radio frequency ("RF") data device, a pager, a global positioning satellite ("GPS") receiver, etc.

As known, the vehicular bus contains various proprietary information and safety-related information such as, for example, an anti-theft system computer program or an anti-lock braking system computer program. As a result, generally the user bus is not directly coupled to the vehicular bus; instead, the user bus is coupled to the vehicular bus by means of a vehicular gateway.

Therefore, in order to provide user devices with the ability to communicate and interact with vehicle systems, it would be desirable to arrange the gateway with a method to transport vehicle information that is present on the vehicle bus to the user bus for the benefit of one or more target user devices. Further, in order to support enhanced user device applications, it would be desirable to provide the user devices with a method to program the gateway with various gateway "rules" which rules, in turn, would control the transport of the aforementioned vehicle information to the user bus.

As well, in order to provide vehicle systems with the ability to communicate and interact with user devices, it would be desirable to arrange the gateway with a method to transport user information that is present on the user bus to the vehicle bus for the benefit of one or more target vehicle systems. Further, in order to support enhanced vehicle system applications, it would be desirable to provide the vehicle systems with a method to program the gateway with various gateway rules which, in turn, would control the transport of the aforementioned user information to the vehicle bus.

As a result, there is a need for a method for a vehicular gateway to transport information, including a method for programming the gateway.

BRIEF DESCRIPTION OF THE DRAWINGS

FIG. 1 shows a vehicle 100 including a vehicle bus 10, a vehicle gateway 20 and a user bus 30, the vehicle bus coupled to the user bus by means of the gateway; the vehicle 100 being suitable for demonstrating a method for a vehicle gateway to transport information, including a method for programming the gateway, in accordance with the present invention.

FIG. 2 is a flow diagram for a first embodiment for the vehicle gateway to transport information, in accordance with the present invention.

FIG. 3 is a flow diagram for a first embodiment of a method for programming the vehicle gateway, in accordance with the present invention.

DESCRIPTION OF THE PREFERRED EMBODIMENT

Briefly, a vehicle includes vehicle systems coupled to a vehicle bus and user devices coupled to a user bus, the user bus coupled to the vehicle bus by a gateway. The user bus transports user information and the vehicle bus transports vehicle information. Based on one or more gateway rules, the gateway transports vehicle information to the user bus for the benefit of target user devices. Also based on these gateway rules, the gateway transports user information to the vehicle bus for the benefit of target vehicle systems. The gateway rules are programmed by both user devices and vehicle systems as follows: First, a proposed rule is provided to the gateway. Second, the gateway determines when to accept the proposed rule based on a variety of factors. Third, when the proposed rule is accepted, the proposed rule becomes a gateway rule.

Referring now to FIG. 1, there is shown a vehicle 100 having a vehicle bus 10 and a user bus 30, the vehicle bus and the user bus being coupled to a vehicle gateway 20. As shown, the vehicle bus supports and is coupled to a plurality of vehicle systems 11, 12, 13. Also, the user bus supports and is coupled to a plurality of user devices 40, 50, 60. Each of the plurality of vehicle systems including a unique function; for example, vehicle system 12 is an engine. As well, each of the plurality of user devices supports a unique function. For example, user device 50 comprises a first RF data device arranged to communicate with a first remote device 110, the first remote device 110 being located separately from the vehicle 100. As well, user device 60 comprises a second RF data device arranged to communicate with a second remote device 120, the second remote device 120 being located separately from the vehicle 100.

Moreover, the vehicle 100 comprises a plurality of vehicle systems, a plurality of user devices, a vehicle bus and a user bus, the vehicle bus transporting vehicle information and coupled to the vehicle systems, the user bus transporting user information and coupled to the user devices, the vehicle bus coupled to the user bus by means of the gateway 20.

Therefore, in accordance with the present invention, in order to provide user devices 40–60 with the ability to communicate and interact with vehicle systems 11–13, the gateway 20 is arranged with a method to transport vehicle information that is present on the vehicle bus 10 to the user bus 30 for the benefit of one or more target user devices.

Referring now to FIG. 2, there is a flow diagram for a method for the gateway 20 to transport vehicle information to the user bus 30 for the benefit of one or more target user devices. The process starts, step 201, and then proceeds to step 203.

In step 203, the gateway detects vehicle information on the vehicle bus.

Next, in step 205, the gateway determines when to receive the vehicle information. If the result of this determination is positive, the process goes to step 207; but if the result is negative, the process goes to step 230.

In one embodiment, each vehicle system provides a unique type of vehicle information, and the determining step 205 is based on the type of vehicle information.

In another embodiment, the determining step 205 is based on one or more receiving gateway rules, the one or more receiving gateway rules based on one or more proposed rules provided by one or more user devices.

In step 207, when the gateway has determined to receive the vehicle information, the gateway receives the vehicle information, thus forming received information.

The process next goes to step 209. Generally, the user information for each target user device has a unique user format. In step 209, the gateway determines when to format the received information based on one or more user formats. If the result of this determination is positive, the process goes to step 211; but if the result is negative, the process goes to step 213.

In one embodiment, the determining step 209 is based on one or more formatting gateway rules, the one or more formatting gateway rules based on one or more proposed rules provided by one or more user devices.

In step 211, when the gateway has determined to format the received information, the gateway formats the received information based on one or more user formats.

The process next goes to step 213. Generally, each target user device has a unique user address. In step 213, the gateway determines when to address the received information based on one or more user addresses. If the result of this determination is positive, the process goes to step 215; but if the result is negative, the process goes to step 217.

In one embodiment, the determining step 213 is based on one or more addressing gateway rules, the one or more addressing gateway rules based on one or more proposed rules provided by one or more user devices.

In step 215, when it is determined to address the received information, the gateway addresses the received information based on one or more user addresses.

The process next goes to step 217. In step 217, the gateway determines when to transport the received information to the user bus. If the result of this determination is positive, the process goes to step 219; but if the result is negative, the process goes to step 230.

In one embodiment, the determining step 217 is based on one or more transporting gateway rules, the one or more transporting gateway rules based on one or more proposed rules provided by one or more user devices.

In step 219, when it is determined to transport the received information to the user bus, the gateway transports the received information to the user bus.

In the next step, step 230, the process ends.

As well, in accordance with the present invention, in order to provide vehicle systems 11–13 with the ability to communicate and interact with user devices 40–60, the gateway 20 is arranged with a method to transport user information that is present on the user bus 30 to the vehicle bus 10 for the benefit of one or more target vehicle systems.

Referring again to FIG. 2, the flow diagram there and which flow diagram has been discussed above also serves as a flow diagram for a method for the gateway 20 to transport user information to the vehicle bus 10 for the benefit of one or more target vehicle systems. The process starts, step 201, and then proceeds to step 203.

In step 203, the gateway detects user information on the user bus.

Next, in step 205, the gateway determines when to receive the user information. If the result of this determination is positive, the process goes to step 207; but if the result is negative, the process goes to step 230.

In one embodiment, each user device provides a unique type of user information, and the determining step 205 is based on the type of user information.

In another embodiment, the determining step 205 is based on one or more receiving gateway rules, the one or more receiving gateway rules based on one or more proposed rules provided by one or more vehicle systems.

In step 207, when the gateway has determined to receive the user information, the gateway receives the user information, thus forming received information.

The process next goes to step 209. Generally, the vehicle information for each target vehicle system has a unique vehicle format. In step 209, the gateway determines when to format the received information based on one or more vehicle formats. If the result of this determination is positive, the process goes to step 211; but if the result is negative, the process goes to step 213.

In one embodiment, the determining step 209 is based on one or more formatting gateway rules, the one or more formatting gateway rules based on one or more proposed rules provided by one or more vehicle systems.

In step 211, when the gateway has determined to format the received information, the gateway formats the received information based on one or more vehicle formats.

The process next goes to step 213. Generally, each target vehicle system has a unique vehicle address. In step 213, the gateway determines when to address the received information based on one or more vehicle addresses. If the result of this determination is positive, the process goes to step 215; but if the result is negative, the process goes to step 217.

In one embodiment, the determining step 213 is based on one or more addressing gateway rules, the one or more addressing gateway rules based on one or more proposed rules provided by one or more vehicle systems.

In step 215, when it is determined to address the received information, the gateway addresses the received information based on one or more vehicle addresses.

The process next goes to step 217. In step 217, the gateway determines when to transport the received information to the vehicle bus. If the result of this determination is positive, the process goes to step 219; but if the result is negative, the process goes to step 230.

In one embodiment, the determining step 217 is based on one or more transporting gateway rules, the one or more transporting gateway rules based on one or more proposed rules provided by one or more vehicle systems.

In step 219, when it is determined to transport the received information to the vehicle bus, the gateway transports the received information to the vehicle bus.

Next, in step 230, the process ends.

Further, in order to support enhanced user device applications, in accordance with the present invention, the user devices 40–60 are provided with a method to program the gateway with various gateway rules which rules, in turn, control the transport of the aforementioned vehicle information from the vehicle bus 10 to the user bus 30.

Referring now to FIG. 3, there is shown a flow diagram for a first embodiment of a method for programming the vehicle gateway 20 by the user devices 40–60, in accordance with the present invention. The process starts, step 301, and then proceeds to step 303.

In step 303, a requesting user device provides the gateway with a proposed rule.

Next, in step 305, the gateway determines when to accept the proposed rule. If the result of this determination is positive, the process goes to step 307; but if the result is negative, the process goes to step 309.

In one embodiment, the gateway determining step 305 always determines to accept the proposed rule; thus, in this embodiment, the decision of step 305 is predetermined, fixed, unilateral, and independent of and without regard to other factors, conditions, or parameters.

In another embodiment, the gateway determining step 305 includes a step of determining when to accept the proposed rule based on the serial number or identification code ("ID") of the requesting user device.

In another embodiment, the gateway determining step 305 includes a step of determining when to accept the proposed rule based on when an associated fee has been paid.

In another embodiment, the gateway determining step 305 includes a step of determining when to accept the proposed rule based on when a correct password has been input.

In another embodiment, the gateway determining step 305 includes a step of determining when to accept the proposed rule based on the vehicle's identification number ("VIN").

In another embodiment, the gateway determining step 305 includes a step of determining when to accept the proposed rule based on the security clearance of the user.

In another embodiment, the gateway determining step 305 includes a step of determining when to accept the proposed rule based on an encrypted challenge and response provided by the user.

In another embodiment, the gateway determining step 305 includes a step of determining when to accept the proposed rule based on the current location of the vehicle.

In another embodiment, the gateway determining step 305 includes a step of determining when to accept the proposed rule based on the current date.

In another embodiment, the gateway determining step 305 includes a step of determining when to accept the proposed rule based on the current time.

In another embodiment, the gateway determining step 305 includes a step of determining when to accept the proposed rule based on obtaining authorization from a remote source.

When the gateway has determined to accept the proposed rule, in step 307, the gateway accepts the proposed rule as a gateway rule.

The process then ends, step 309.

It will be understood that these gateway rules discussed here in connection with FIG. 3 correspond to the receiving, formatting, addressing and transporting gateway rules discussed above in connection with FIG. 2.

Further, in order to support enhanced vehicle system applications, in accordance with the present invention, the vehicle systems 11–13 are provided with a method to program the gateway with various gateway rules which, in turn, control the transport of the aforementioned user information from the user bus 30 to the vehicle bus 10.

Referring again to FIG. 3, the flow diagram there and which flow diagram has been discussed above also serves as a flow diagram for a method for programming the vehicle gateway 20 by the vehicle systems 11–13, in accordance with the present invention. The process starts, step 301, and then proceeds to step 303.

In step 303, a requesting vehicle system provides the gateway with a proposed rule.

Next, in step 305, the gateway determines when to accept the proposed rule. If the result of this determination is positive, the process goes to step 307; but if the result is negative, the process goes to step 309.

In one embodiment, the gateway determining step 305 always determines to accept the proposed rule; thus, in this embodiment, the decision of step 305 is predetermined, fixed, unilateral, and independent of and without regard to other factors, conditions, or parameters.

In another embodiment, the gateway determining step 305 includes a step of determining when to accept the proposed rule based on the serial number or identification code ("ID") of the requesting vehicle system.

In another embodiment, the gateway determining step 305 includes a step of determining when to accept the proposed rule based on when an associated fee has been paid.

In another embodiment, the gateway determining step 305 includes a step of determining when to accept the proposed rule based on when a correct password has been input.

In another embodiment, the gateway determining step 305 includes a step of determining when to accept the proposed rule based on the vehicle's identification number ("VIN").

In another embodiment, the gateway determining step 305 includes a step of determining when to accept the proposed rule based on the security clearance of the user.

In another embodiment, the gateway determining step 305 includes a step of determining when to accept the proposed rule based on an encrypted challenge and response provided by the user.

In another embodiment, the gateway determining step 305 includes a step of determining when to accept the proposed rule based on the current location of the vehicle.

In another embodiment, the gateway determining step 305 includes a step of determining when to accept the proposed rule based on the current date.

In another embodiment, the gateway determining step 305 includes a step of determining when to accept the proposed rule based on the current time.

In another embodiment, the gateway determining step 305 includes a step of determining when to accept the proposed rule based on obtaining authorization from a remote source.

When the gateway has determined to accept the proposed rule, in step 307, the gateway accepts the proposed rule as a gateway rule.

The process then ends, step 309.

As mentioned above, these gateway rules discussed here in connection with FIG. 3 correspond to the receiving, formatting, addressing and transporting gateway rules discussed above in connection with FIG. 2.

We claim:

1. In a vehicle having a plurality of vehicle systems, a plurality of user devices, and having a vehicle bus and a user bus, the vehicle bus transporting vehicle information and coupled to the plurality of vehicle systems, the user bus transporting user information and coupled to the plurality of user devices, the vehicle bus coupled to the user bus by means of a gateway, the gateway arranged for transporting vehicle information to the user bus based on one or more gateway rules, a method for determining the gateway rules, including the steps of:

(a) by a requesting user device, providing the gateway with a proposed rule;
(b) by the gateway, determining when to accept the proposed rule; and
(c) by the gateway, when the gateway has determined to accept the proposed rule, accepting the proposed rule as a gateway rule.

2. The method of claim 1, the gateway determining step (b) including a step of always determining to accept the proposed rule.

3. The method of claim 1, the gateway determining step (b) including a step of determining when to accept the proposed rule based on the ID of the requesting user device.

4. The method of claim 1, the gateway determining step (b) including a step of determining when to accept the proposed rule based on when an associated fee has been paid.

5. The method of claim 1, the gateway determining step (b) including a step of determining when to accept the proposed rule based on when a correct password has been input.

6. The method of claim 1, the gateway determining step (b) including a step of determining when to accept the proposed rule based on the vehicle's identification number ("VIN").

7. The method of claim 1, the gateway determining step (b) including a step of determining when to accept the proposed rule based on the security clearance of the user.

8. The method of claim 1, the gateway determining step (b) including a step of determining when to accept the proposed rule based on an encrypted challenge and response provided by the user.

9. The method of claim 1, the gateway determining step (b) including a step of determining when to accept the proposed rule based on the current location of the vehicle.

10. The method of claim 1, the gateway determining step (b) including a step of determining when to accept the proposed rule based on the current date.

11. The method of claim 1, the gateway determining step (b) including a step of determining when to accept the proposed rule based on the current time.

12. The method of claim 1, the gateway determining step (b) including a step of determining when to accept the proposed rule based on obtaining authorization from a remote source.

13. In a vehicle having a plurality of vehicle systems, a plurality of user devices, and having a vehicle bus and a user bus, the vehicle bus transporting vehicle information and coupled to the plurality of vehicle systems, the user bus transporting user information and coupled to the plurality of user devices, the vehicle bus coupled to the user bus by means of a gateway,
a method for the gateway to transport vehicle information to the user bus for the benefit of one or more target user devices, including the steps of:
(a) detecting vehicle information on the vehicle bus;
(b) determining when to receive the vehicle information; and
(c) when it is determined to receive the vehicle information, receiving the vehicle information, thus forming received information.

14. The method of claim 13, each vehicle system providing a unique type of vehicle information, the determining step (b) based on the type of vehicle information.

15. The method of claim 14, the determining step (b) based on one or more receiving gateway rules, the one or more receiving gateway rules based on one or more proposed rules provided by one or more user devices.

16. The method of claim 13, the user information for each target user device having a unique user format, and including the subsequent steps of:
(d) determining when to format the received information based on one or more user formats; and
(e) when it is determined to format the received information, formatting the received information based on one or more user formats.

17. The method of claim 16, the determining step (d) based on one or more formatting gateway rules, the one or more formatting gateway rules based on one or more proposed rules provided by one or more user devices.

18. The method of claim 16, each target user device having a unique user address, and including the subsequent steps of:
(f) determining when to address the received information based on one or more user addresses; and
(g) when it is determined to address the received information, addressing the received information based on one or more user addresses.

19. The method of claim 18, the determining step (f) based on one or more addressing gateway rules, the one or more addressing gateway rules based on one or more proposed rules provided by one or more user devices.

20. The method of claim 13, each target user device having a unique user address, and including the subsequent steps of:
(f) determining when to address the received information based on one or more user addresses; and
(g) when it is determined to address the received information, addressing the received information based on one or more user addresses.

21. The method of claim 20, the determining step (f) based on one or more addressing gateway rules, the one or more addressing gateway rules based on one or more proposed rules provided by one or more user devices.

22. The method of claim 18, including the subsequent steps of:
(h) determining when to transport the received information to the user bus; and
(i) when it is determined to transport the received information to the user bus, transporting the received information to the user bus.

23. The method of claim 22, the determining step (h) based on one or more transporting gateway rules, the one or more transporting gateway rules based on one or more proposed rules provided by one or more user devices.

24. The method of claim 20, including the subsequent steps of:
(h) determining when to transport the received information to the user bus; and
(i) when it is determined to transport the received information to the user bus, transporting the received information to the user bus.

25. The method of claim 24, the determining step (h) based on one or more transporting gateway rules, the one or more transporting gateway rules based on one or more proposed rules provided by one or more user devices.

26. The method of claim 16, including the subsequent steps of:
(h) determining when to transport the received information to the user bus; and
(i) when it is determined to transport the received information to the user bus, transporting the received information to the user bus.

27. The method of claim 26, the determining step (h) based on one or more transporting gateway rules, the one or more transporting gateway rules based on one or more proposed rules provided by one or more user devices.

28. The method of claim 13, including the subsequent steps of:
   (h) determining when to transport the received information to the user bus; and
   (i) when it is determined to transport the received information to the user bus, transporting the received information to the user bus.

29. The method of claim 28, the determining step (h) based on one or more transporting gateway rules, the one or more transporting gateway rules based on one or more proposed rules provided by one or more user devices.

30. In a vehicle having a plurality of vehicle systems, a plurality of user devices, and having a vehicle bus and a user bus, the vehicle bus transporting vehicle information and coupled to the plurality of vehicle systems, the user bus transporting user information and coupled to the plurality of user devices, the vehicle bus coupled to the user bus by means of a gateway,
   the gateway arranged for transporting user information to the vehicle bus based on one or more gateway rules,
   a method for determining the gateway rules, including the steps of:
   (a) by a requesting vehicle system, providing the gateway with a proposed rule;
   (b) by the gateway, determining when to accept the proposed rule; and
   (c) by the gateway, when the gateway has determined to accept the proposed rule, accepting the proposed rule as a gateway rule.

31. The method of claim 30, the gateway determining step (b) including a step of always determining to accept the proposed rule.

32. The method of claim 30, the gateway determining step (b) including a step of determining when to accept the proposed rule based on the ID of the requesting vehicle system.

33. The method of claim 30, the gateway determining step (b) including a step of determining when to accept the proposed rule based on when an associated fee has been paid.

34. The method of claim 30, the gateway determining step (b) including a step of determining when to accept the proposed rule based on when a correct password has been input.

35. The method of claim 30, the gateway determining step (b) including a step of determining when to accept the proposed rule based on the vehicle's identification number ("VIN").

36. The method of claim 30, the gateway determining step (b) including a step of determining when to accept the proposed rule based on the security clearance of the user.

37. The method of claim 30, the gateway determining step (b) including a step of determining when to accept the proposed rule based on an encrypted challenge and response provided by the user.

38. The method of claim 30, the gateway determining step (b) including a step of determining when to accept the proposed rule based on the current location of the vehicle.

39. The method of claim 30, the gateway determining step (b) including a step of determining when to accept the proposed rule based on the current date.

40. The method of claim 30, the gateway determining step (b) including a step of determining when to accept the proposed rule based on the current time.

41. The method of claim 30, the gateway determining step (b) including a step of determining when to accept the proposed rule based on obtaining authorization from a remote source.

42. In a vehicle having a plurality of vehicle systems, a plurality of user devices, and having a vehicle bus and a user bus, the vehicle bus transporting vehicle information and coupled to the plurality of vehicle systems, the user bus transporting user information and coupled to the plurality of user devices, the vehicle bus coupled to the user bus by means of a gateway,
   a method for the gateway to transport user information to the vehicle bus for the benefit of one or more target vehicle systems, including the steps of:
   (a) detecting user information on the user bus;
   (b) determining when to receive the user information; and
   (c) when it is determined to receive the user information, receiving the user information, thus forming received information.

43. The method of claim 42, each user device providing a unique type of user information, the determining step (b) based on the type of user information.

44. The method of claim 43, the determining step (b) based on one or more receiving gateway rules, the one or more receiving gateway rules based on one or more proposed rules provided by one or more vehicle systems.

45. The method of claim 42, the vehicle information for each target vehicle system having a unique vehicle format, and including the subsequent steps of:
   (d) determining when to format the received information based on one or more vehicle formats; and
   (e) when it is determined to format the received information, formatting the received information based on one or more vehicle formats.

46. The method of claim 45, the determining step (d) based on one or more formatting gateway rules, the one or more formatting gateway rules based on one or more proposed rules provided by one or more vehicle systems.

47. The method of claim 45, each target vehicle system having a unique vehicle address, and including the subsequent steps of:
   (f) determining when to address the received information based on one or more vehicle addresses; and
   (g) when it is determined to address the received information, addressing the received information based on one or more vehicle addresses.

48. The method of claim 47, the determining step (f) based on one or more addressing gateway rules, the one or more addressing gateway rules based on one or more proposed rules provided by one or more vehicle systems.

49. The method of claim 42, each target vehicle system having a unique vehicle address, and including the subsequent steps of:
   (f) determining when to address the received information based on one or more vehicle addresses; and
   (g) when it is determined to address the received information, addressing the received information based on one or more vehicle addresses.

50. The method of claim 49, the determining step (f) based on one or more addressing gateway rules, the one or more addressing gateway rules based on one or more proposed rules provided by one or more vehicle systems.

51. The method of claim 47, including the subsequent steps of:
   (h) determining when to transport the received information to the vehicle bus; and (i) when it is determined to transport the received information to the vehicle bus, transporting the received information to the vehicle bus.

52. The method of claim 51, the determining step (h) based on one or more transporting gateway rules, the one or more transporting gateway rules based on one or more proposed rules provided by one or more vehicle systems.

53. The method of claim 49, including the subsequent steps of:

(h) determining when to transport the received information to the vehicle bus; and (i) when it is determined to transport the received information to the vehicle bus, transporting the received information to the vehicle bus.

54. The method of claim 53, the determining step (h) based on one or more transporting gateway rules, the one or more transporting gateway rules based on one or more proposed rules provided by one or more vehicle systems.

55. The method of claim 45, including the subsequent steps of:

(h) determining when to transport the received information to the vehicle bus; and (i) when it is determined to transport the received information to the vehicle bus, transporting the received information to the vehicle bus.

56. The method of claim 55, the determining step (h) based on one or more transporting gateway rules, the one or more transporting gateway rules based on one or more proposed rules provided by one or more vehicle systems.

57. The method of claim 42, including the subsequent steps of:

(h) determining when to transport the received information to the vehicle bus; and (i) when it is determined to transport the received information to the vehicle bus, transporting the received information to the vehicle bus.

58. The method of claim 57, the determining step (h) based on one or more transporting gateway rules, the one or more transporting gateway rules based on one or more proposed rules provided by one or more vehicle systems.

* * * * *